(No Model.)
B. FLOERSHEIM.
NUT LOCK.
No. 472,637. Patented Apr. 12, 1892.
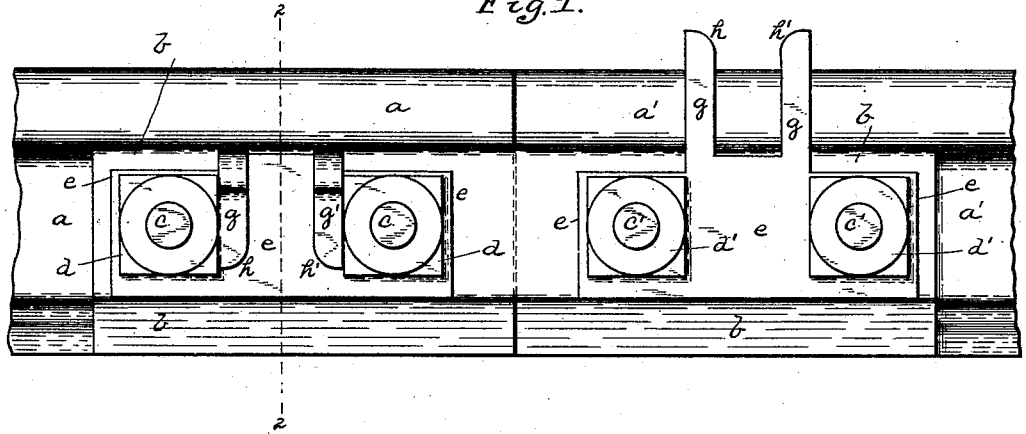
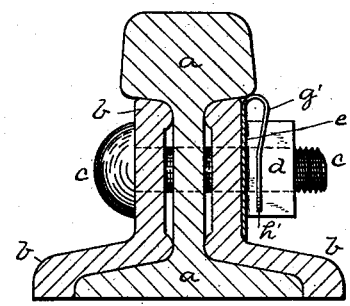
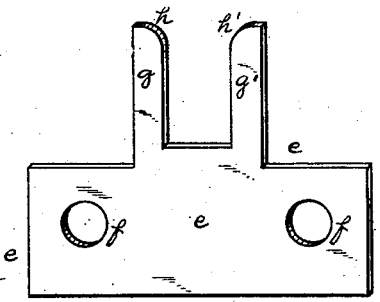
Witnesses:
J. N. Cooney
Robt. D. Totten
Inventor
Berthold Floersheim
By Kay & Totten
attys.

UNITED STATES PATENT OFFICE.

BERTHOLD FLOERSHEIM, OF ALLEGHENY, PENNSYLVANIA.

NUT-LOCK.

SPECIFICATION forming part of Letters Patent No. 472,637, dated April 12, 1892.

Application filed February 4, 1892. Serial No. 420,312. (No model.)

*To all whom it may concern:*

Be it known that I, BERTHOLD FLOERSHEIM, a resident of Allegheny, in the county of Allegheny and State of Pennsylvania, have invented a new and useful Improvement in Nut-Locks; and I do hereby declare the following to be a full, clear, and exact description thereof.

My invention relates to nut-locks.

It consists, generally stated, in a plate having tongues projecting therefrom, said tongues being arranged at right angles to a line drawn through the bolt-holes in said plate, and said tongues being adapted to engage with the side of the nut parallel and adjacent thereto and independently of the other, whereby either one of the said tongues may be bent back, in order to release the nut adjacent thereto without unlocking the other nut.

To enable others skilled in the art to make and use my invention, I will describe the same more fully, referring to the accompanying drawings, in which—

Figure 1 is a view of rail-sections with my improved nut-lock secured thereto and showing at one side thereof the tongues in engagement with the nuts, and at the other side the tongues bent back. Fig. 2 is a transverse sectional view of the rail fish-plates and locking-plate, showing one of the tongues in engagement with the nut. Fig. 3 is a face view of the locking-plate removed.

Like letters indicate like parts in each.

Although my invention is illustrated in connection with a rail-joint, I do not confine myself to that special use, as it may be employed for other analogous purposes.

$a\ a'$ represent sections of a rail; $b$, a fish-plate; $c\ c'$ bolts, and $d\ d'$ nuts.

The locking-plate $e$ is formed of steel or other metal of sufficient elasticity to permit of its being bent readily without breaking. The locking-plate $e$ is provided with the bolt-holes $f$ and the projecting tongues $g\ g'$. These tongues $g\ g'$ may extend upwardly from said locking-plate, as shown, or they may extend downwardly and accomplish the same result. The ends of the tongues $g\ g'$ on their inner edges are slightly curved, as at $h\ h'$, respectively.

To lock the nuts $d\ d'$ by the use of my improved nut-lock, the locking-plate $e$, with the tongues $g\ g'$ in their normal position, as shown in Fig. 3, is placed next to the fish-plate $b$, when the bolts $c\ c'$ pass through the openings $f$, and to said bolts are secured the nuts $d\ d'$. When said nuts have been tightened properly and brought to such positions that their adjacent sides are parallel, the tongues $g\ g'$ are bent down to the positions shown in Fig. 1. The tongues $g\ g'$ being thus brought into contact with the parallel and adjacent sides of the nuts, prevent any movement on the part of said nuts, and lock them securely against turning. In case for any reason it is desired to remove one of the nuts $d\ d'$, it is only necessary to bend back the tongue adjacent to the nut to be removed, when said nut is then free to turn. By having the tongues $g\ g'$ slightly cut away, as shown at $h\ h'$, respectively, a space is formed between the ends of said tongues, whereby the bar or other implement used to raise said tongues may be readily inserted beneath said tongues. I thus obtain a nut-lock which consists of a single plate adapted to lock two nuts, and yet one in which each nut may be adjusted or removed independently of the other nut.

What I claim as my invention, and desire to secure by Letters Patent, is—

A nut-lock consisting of a plate having tongues projecting thereupon, said tongues being arranged at right angles to a line drawn through the bolt-holes in said plate and said tongue being adapted to engage with the side of the nut parallel and adjacent thereto, whereby either of said tongues may be bent back to release the nut adjacent thereto without unlocking the other nut, substantially as and for the purpose set forth.

In testimony whereof I, the said BERTHOLD FLOERSHEIM, have hereunto set my hand.

BERTHOLD FLOERSHEIM.

Witnesses:
J. N. COOKE,
ROBT. D. TOTTEN.